Figure 1:
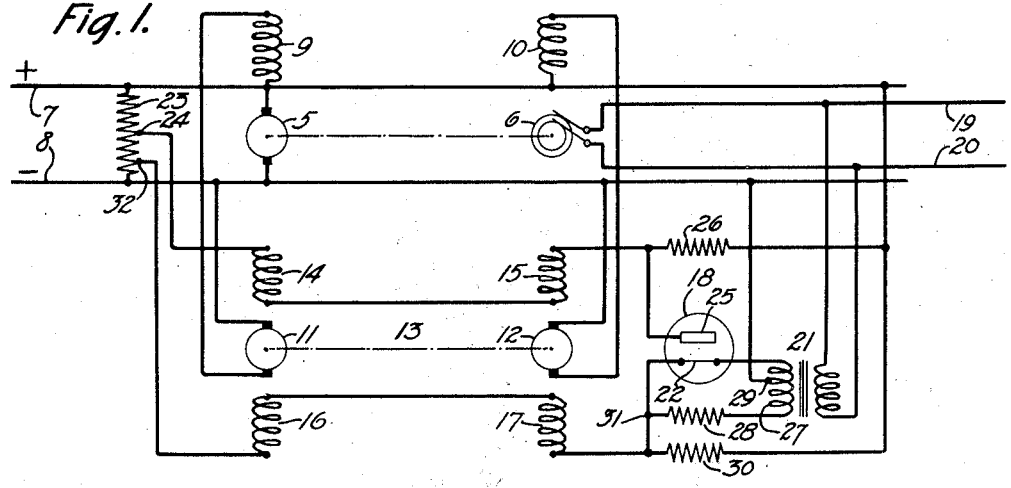

April 12, 1927.

H. M. STOLLER 1,624,566

CONTROL REGULATOR

Filed July 3, 1924

Inventor:
Hugh M. Stoller
by E. W. Adam
Att'y.

Patented Apr. 12, 1927.

1,624,566

UNITED STATES PATENT OFFICE.

HUGH M. STOLLER, OF MOUNTAIN LAKES, NEW JERSEY, ASSIGNOR TO WESTERN ELECTRIC COMPANY, INCORPORATED, OF NEW YORK, N. Y., A CORPORATION OF NEW YORK.

CONTROL REGULATOR.

Application filed July 3, 1924. Serial No. 723,856.

This invention relates to a regulator which is applicable, in general, for the regulation of electric circuits but which is particularly adapted for regulating motor-generator sets.

An object of the invention is to provide substantially uniform regulation in circuits of the above-mentioned character throughout a wide range of variations in load and power supply.

It is often desirable to regulate the output of a motor-generator set which is subject to wide variations both in load and power supply conditions. Any change in the supply voltage, of course, varies the speed of the motor and thus the generator voltage and, if it be an alternating current generator, also its frequency.

One object of this invention is to automatically and simultaneously regulate both the speed of the motor and the excitation of the generator so as to prevent variations in the characteristics of the generator even under widely varying load and supply conditions.

According to one feature of this invention this is accomplished by providing an auxiliary dynamo electric machine for simultaneously controlling the speed of the motor and the excitation of the generator. In order to control the action of this auxiliary machine synchronously with variations in the load and supply conditions and to avoid fluctuations in the generator characteristics a regulator of the electron discharge or vacuum tube type is provided.

As is well known in the art, the cathode of a vacuum tube serves as a source of electrons that travel to the anode and the amount of this electron stream or space current depends upon several factors, primarily upon the electric field within the tube and also the temperature of the cathode, an increase in temperature producing a greater space current. It is also well known that changes in the temperature of the cathode create a more than proportional change in the space current of the tube so that a vacuum tube may be made to respond very readily to changes in the temperature of the cathode.

In accordance with one form of the invention a field winding of the auxiliary machine is connected in circuit with the anode and cathode of the vacuum tube. By varying the impedance of the anode-cathode circuit, by controlling the temperature of the cathode for example, it is possible to regulate the excitation of the auxiliary machine so as to control its action in regulating the motor-generator set.

Another feature of this invention consists in providing circuit arrangements for supplying current from both the input and output circuits of the motor-generator set to the cathode of the vacuum tube so as to readily control the generator characteristics in response to the variations in both the load and supply conditions.

It has also been found desirable to provide a safety arrangement to prevent an excessive variation in the characteristic of the generator which is being regulated. One method of accomplishing this, is by providing a field winding of the auxiliary machine which becomes active on opening of the filament circuit to reduce the voltage of the generator.

Figure 2:
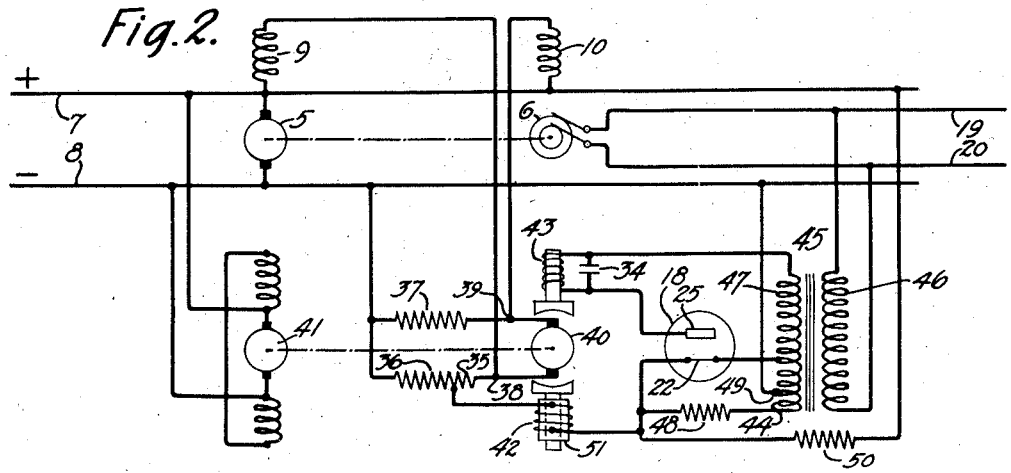

These and other features of the invention will be more clearly understood by reference to the following description in connection with the drawings, in which, Fig. 1 shows one embodiment of this invention using a variable speed auxiliary motor-generator set for controlling the main motor-generator; Fig. 2, a second embodiment of this invention, in a regulator employing a constant speed auxiliary set and Fig. 3, a curve, which illustrates the variation of the thermionic activity of the cathode with respect to changes in the heating current.

Fig. 1 shows a motor-generator set comprising a direct current motor 5 and an alternating current generator 6 directly coupled together. Power is supplied to the motor through the direct current mains 7 and 8. The motor field winding 9 and the generator field winding 10 are respectively connected in series with the armatures 11 and 12 of an auxiliary motor-generator set 13 to the direct current mains. This auxiliary set serves to regulate the field current of the main machines. The auxiliary machines 11 and 12 are provided with main field windings 14 and 15 respectively. The two electrode vacuum tube 18 is used for controlling the current through the main field windings 14 and 15. The cathode 22 of this tube is heated by alternating current supplied from the generator leads 19—20 through the transformer 21. A high resistance 23 is connected across the direct current mains 7—8. Windings 14 and 15 are connected in series between the mid-point 24 of the resistance 23 and anode 25 of the tube 18. Cathode 22 is connected to the negative direct current main 8. A resistance 26 is connected between the anode and the positive direct current main 7. The value of this resistance is so adjusted that at normal alternating current voltage, cathode 25 is at substantially the same potential as the point 24 so that no current will flow through the windings 14 and 15. The auxiliary set 13, therefore, does not revolve and the only resistance in series with the windings 9 and 10 is the direct current resistance of the armatures 11 and 12. If the voltage in the generator tends to increase due to some cause such as a reduction in load, the heating current supplied to the cathode will increase and the impedance of the cathode-anode circuit of the vacuum tube 18 will tend to decrease which will bring the potential of the anode nearer to that of the negative main 8 causing current to flow through fields 14 and 15 from left to right. These fields are wound in such a direction that current flowing in this direction causes the machine 12 to run as a motor driving the machine 11 as the generator. This reduces the generator field and increases the motor field tending to reduce both the excitation and speed of the generator.

A decrease in the generator voltage will reduce the temperature of the cathode, thus increasing the anode-cathode impedance and causing current to flow through the regulator fields from right to left so as to reduce the motor speed and the generator excitation.

Figure 3:
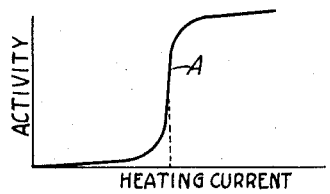

As is well known the thermionic activity of a cathode varies with the heating current supplied thereto in a manner similar to that shown in the curve of Fig. 3 where the abscissae represent various values of heating current and the ordinates the corresponding thermionic activity of the cathode. The filament 22 and the transformer 21 should be so chosen that at normal generated voltage the heating current will be such as to give the thermionic activity of the filament a value corresponding to A, the midpoint of the characteristic curve.

In addition to the features above described, the auxiliary set 13 is provided with auxiliary field windings 16 and 17, and the vacuum tube with an auxiliary direct current heating circuit for the filament. This arrangement serves two purposes. In the first place the direct current through the filament increases when the line voltage increases thereby causing the filament to be brighter than on low line voltages with the same alternating current flowing through the filament. This gives a flatter regulation curve than would be obtained without the auxiliary direct current heating. In the second place the auxiliary fields serve in the manner to be described presently as a safety arrangement which prevents such an abnormal rise in the generator voltage as would endanger the associated apparatus. With only so much of the circuit described in the preceding paragraph, failure of the tube such as the burning out of the filament after a long life would cause the regulating set to cause an increase in voltage in the same way as an increase in impedance of the tube produced by lowering the generator voltage.

A safety feature is therefore provided which causes an opening of the filament circuit to produce a decrease in the generator voltage. In this way not only is the connected apparatus protected against a rise in voltage due to such a mishap as an accidental removing of the tube from its socket or burning out of the filament, but also against an excessive rise in voltage due to any cause as such a tendency to rise would burn out the delicate filament of the regulator tube long before the voltage had reached such a point as to be dangerous to the connected apparatus thus producing a decrease in voltage through the following circuit arrangement.

A resistance 28 is connected in the heating circuit. The negative main 8 is connected to the secondary winding 27 at a point 29 and resistance 30 is connected between the positive main 7 and the point 31 where the resistance 28 is connected to the cathode 22. In this way a path is provided for direct current from the main 7 through the resistance 30 to the point 31 where it will have two parallel paths, one through the cathode 22 and the other through the resistance 28 to the negative main 8. The auxiliary fields 17 and 18 are connected in series by a tap 32 to resistance 23 at a point near the negative main 7 and at the other end to the junction of the resistances 28 and 30. The resistance of the filament 22 being low with respect to the resistance 28 the tap 32 can readily be adjusted so that no current flows through the auxiliary field. However, if the filament should burn out the point 31 will be raised to a positive potential with respect to the point 32 because of the high resistance of the element 28 being substituted for the low resistance of the parallel path comprising resistance 28 and filament 22. Current will then flow from the positive main 7 through the resistance 30, field windings 16 and 17 and the small portion of the resistance 32 to the negative main 8. The auxiliary fields 16 and 17 are so wound that current flowing in this direction causes machine 12 to run as a motor driving 11 as a generator reducing the generator voltage and calling the attention of the operator to the fact that the tube is not functioning.

Fig. 2 shows this invention embodied in another type of regulator. There is shown a direct current motor 5, connected across the direct current mains 7 and 8 and driving an alternating current generator 6. Both the generator and motor fields receive current from the mains 7 and 8. The motor field 9 is connected in series with resistances 35 and 36, and the generator field 10 in series with resistance 37. Bridged between the points 38 and 39 where the motor field 9 and generator field 10 are connected to the resistances 35 and 37, respectively, is the generator armature 40 of a regulator motor generator set, the shunt motor 41 of which receives power from the direct current mains. By controlling the current through the armature of the regulator it is possible to control the fields of both the motor and generator. This current is controlled both in magnitude and direction by the two element vacuum tube 18 through the action of the main field winding 42 and the differential field winding 43. Current is supplied to the main winding 42 from the direct current mains through the connections shown, while rectified current from the vacuum tube 18 is supplied to the differential winding 43 the condenser 34 averaging the pulsating current from the vacuum tube. The filament 22 of the tube 18 is connected to the secondary 44 of the transformer 45, the primary 46 of which is connected to the terminals 19 and 20 of the alternating current generator 6. The differential winding circuit can be traced from the cathode 22, through the secondary winding 47 of the transformer 45, the differential field winding 43, to the plate 25 and through the vacuum tube back to the cathode 22. The space current of the tube 18 and consequently the current through the differential winding 43 are controlled by changes in the temperature of the cathode 22.

If the generator voltage tends to increase, due to a change in load, for example, the regulator will function to reduce the output voltage in the manner now to be described. The increased voltage on the primary of the transformer 45 will increase the current to the cathode and consequently its temperature which causes a more than proportional increase in the space current of the tube, thereby increasing the current through the differential winding 43. This sends a current through the regulator armature 40 in a direction tending to weaken the field of the generator 10 and strengthen the field of the motor 9 thereby reducing the generator voltage. Similarly, if the voltage of the generator tends to fall off the activity of the filament decreases; the field of the regulator is changed in the opposite direction thereby strengthening the generator field and weakening the motor field, thus raising the output voltage.

Connected in series with the cathode 22 and the secondary winding 44 is a resistance 48. A tap 49 from the secondary winding 44 to the negative main 8 and a connection from the positive main 7 through a resistance 50 to the cathode 22, serve to admit a certain amount of direct current to the cathode. This tends to flatten the regulation curve in the same manner as the direct current heating of the cathode in circuit of Fig. 1. These connections also protect the apparatus against an abnormal rise in voltage. Under normal conditions direct current through the resistance 50 flows through the low resistance path offered by the filament 22 and resistance 48 in parallel to the negative main 8. Under these conditions current also flows from the positive main 7 through the motor field winding 9, resistance 35, regulator main winding 42, low resistance cathode 22, to the negative main. If the filament circuit is broken, current through resistance 50 no longer has a low resistance path to the negative main, but instead two parallel paths, one through the resistance 48 and the other through the regulator main winding 42 and the resistance 36, thus reversing the current through the regulator main winding 42, thereby reducing the generator voltage.

In order to prevent hunting a copper sleeve 51 is provided around the main field pole piece of the regulator. This prevents the main field from building up too rapidly in response to sudden changes in the direct current voltage, and thus aids in preventing fluctuations in the generator voltage.

It is understood that the embodiments of the invention described above may be variously modified without departing from the spirit of the invention as defined in the appended claims.

What is claimed is:

1. In a regulator system a motor generator set, an auxiliary dynamo electric machine variably operated with respect to said set, means responsive to variations in a characteristic of said set for controlling said machine in accordance therewith, and connections between said machine and said set whereby the speed of the motor and the excitation of the generator are simultaneously regulated to hold substantially constant the characteristic of said set.

2. In a regulator system a motor generator set, a dynamo electric machine connected in circuit with the field windings of the motor and generator of said set to simultaneously and oppositely vary the excitation of both the motor and generator, and means comprising an electric discharge device for controlling the action of said dynamo electric machine to regulate a characteristic of the generator.

3. In a regulator system a motor generator set, a regulator dynamo electric machine connected in circuit with the field windings of both the motor and the generator of said set to simultaneously and oppositely vary the excitation of both the motor and the generator, means for controlling the action of said regulator comprising an electric discharge device having a thermionic cathode and means for controlling the temperature of said cathode in response to variations in a characteristic of the generator.

4. In a regulator system a motor generator set, a regulator dynamo electric machine connected in circuit with the field windings of both the motor and the generator of said set to simultaneously and oppositely vary the excitation of both the motor and the generator, a field winding for said regulator an electron discharge device having an anode and a thermionic cathode connected in circuit with said field winding, and connections from the generator for supplying heating current to the cathode.

5. In combination, a machine for converting electrical energy of one form into electrical energy of another form, means for controlling a characteristic of the output of said machine, said means comprising an electron discharge device having a plurality of electrodes, and means for simultaneously supplying electrical energy of both of said forms to said device for heating one of said electrodes.

6. In combination, a machine for converting electrical energy of one form into electrical energy of another form, means for controlling a characteristic of the output of said machine, said means comprising an electron discharge device, and means for supplying electric energy of both of said forms to said electron discharge device for controlling the impedance of said device in response to fluctuations both in a characteristic of the electric energy supplied to said machine and in a characteristic of the output of said machine.

7. In combination, a dynamo electric machine for converting direct current into alternating current, means for controlling a characteristic of said machine comprising an electron discharge device having a thermionic cathode, means for supplying alternating current from the output of said machine for heating said cathode, means for supplying direct current from the input of said machine for heating said cathode, said means acting simultaneously, and connections for controlling said characteristic of said machine in response to changes in the impedance of said electron discharge device.

8. A regulator for a motor generator set comprising a direct current motor having a field winding and an alternating current generator having a field winding, said regulator comprising a regulating dynamo electric machine connected in circuit with the field windings of both the motor and the generator, an electron discharge device arranged to control the action of said dynamo electric machine so as to regulate a characteristic of the generator, means for supplying direct current to said electron discharge device for controlling the impedance thereof and simultaneously acting means for supplying alternating current to said electron discharge device for controlling the impedance thereof.

9. A regulator for a motor generator set comprising a direct current motor having a field winding and an alternating current generator having a field winding, said regulator comprising a dynamo electric machine connected in circuit with the field windings of both the motor and the generator to simultaneously and oppositely vary the excitation of both the motor and the generator, a field winding for said dynamo electric machine, an electron discharge device having an anode and a thermionic cathode connected in circuit with said field winding, means for supplying alternating current to said device for heating said cathode, and simultaneously acting means for supplying direct current to said device for heating said cathode.

10. A regulator for a motor generator set comprising an auxiliary dynamo electric machine arranged to simultaneously and oppositely vary the field strength of both the motor and the generator, field windings for said auxiliary electric machine, an electron discharge device having an anode and a cathode connected in circuit with one of said field windings, connections from the generator for supplying heating current to said cathode, and means active on opening of the cathode circuit for supplying current to another of said field windings in such a direction as to cause the auxiliary machine to reduce the generator voltage.

11. In a regulator for a motor generator set comprising an auxiliary dynamo electric machine arranged to simultaneously and oppositely vary the field strength of both the motor and the generator, a plurality of field windings for said auxiliary electric dynamo machine, an electron discharge device having an anode and a cathode connected in a circuit with one of said field windings, and connections from the generator to the cathode for supplying heating current thereto, an impedance having a resistance higher than the resistance of said cathode connected in series with said cathode, connections from one of the power supply mains through said cathode and resistance in parallel to one terminal of another of said field windings, a resistance connected from said terminal to the other of the power mains and connections from the other terminal of said other field winding to both of the power mains so that the current through said other field winding is reversed on opening of the cathode circuit.

12. In combination, a motor generator set comprising a direct current motor and an alternating current generator, a dynamo electric machine for simultaneously and oppositely varying the speed of the motor and the excitation of the generator, a field winding for said auxiliary machine, an electron discharge device having an anode and a cathode connected in circuit with said field winding, a resistance, a transformer having a primary winding connected to the output terminals of said generator and a secondary winding connected to said resistance and cathode in series, a second field winding for said dynamo electric machine, connections from one terminal of said motor to one terminal of said second winding and connections from the other terminal of said winding through said resistance and cathode in parallel to the other terminal of said motor.

13. A regulator for a dynamo electric machine comprising a regulating generator, a plurality of field windings for said regulating generator, an electron discharge device having an anode and a thermionic cathode connected in circuit with one of said field windings, connections for supplying to said cathode heating current which varies in accordance with variations in a characteristic of said dynamo electric machine, connections for controlling said characteristic of said machine in accordance with changes in the voltage of said regulating generator, and means active on the opening of the cathode circuit for supplying current to another of said field windings in such a direction as to cause the regulating generator to prevent an excess variation in said characteristic of said machine.

In witness whereof, I hereunto subscribe my name this 27th day of June, A. D. 1924.

HUGH M. STOLLER.